United States Patent
Taka (10) Patent No.: US 8,773,061 B2
(45) Date of Patent: Jul. 8, 2014

(54) DRIVE CIRCUIT AND DRIVE METHOD OF A STEPPING MOTOR

(75) Inventor: Hiroaki Taka, Gumma (JP)

(73) Assignee: Nidec Servo Corporation, Gumma (JP)

(*) Notice: Subject to any disclaimer, the term of this patent is extended or adjusted under 35 U.S.C. 154(b) by 351 days.

(21) Appl. No.: 13/346,762

(22) Filed: Jan. 10, 2012

(65) Prior Publication Data

US 2012/0176075 A1 Jul. 12, 2012

(30) Foreign Application Priority Data

Jan. 12, 2011 (JP) ................................ 2011-003548

(51) Int. Cl.
G05B 19/40 (2006.01)

(52) U.S. Cl.
USPC ............................. 318/685; 318/696; 318/640

(58) Field of Classification Search
USPC .......... 318/685, 696, 640, 577, 603, 591, 480, 318/576
See application file for complete search history.

(56) References Cited

U.S. PATENT DOCUMENTS

| 4,720,726 A | * | 1/1988 | Sato et al. ...................... 396/244 |
| 4,739,346 A | * | 4/1988 | Buckley ......................... 346/138 |
| 7,037,092 B2 | | 5/2006 | Kagawa et al. |

FOREIGN PATENT DOCUMENTS

| CN | 1475885 A | 2/2004 |
| JP | 10-243693 A | 9/1998 |
| JP | 2002-359997 A | 12/2002 |
| JP | 2006-223448 A | 8/2006 |
| JP | 2007-037320 A | 2/2007 |
| JP | 2008-308994 A | 12/2008 |

* cited by examiner

Primary Examiner — Karen Masih
(74) Attorney, Agent, or Firm — Keating & Bennett, LLP (57) ABSTRACT

A stepping motor drive circuit includes a control-purpose controller including a control-purpose position detecting unit; a rotation command information inputting unit arranged to receive command information on the rotating position of the stepping motor; a control-purpose deviation calculating unit arranged to calculate a positional deviation between the rotating position of the stepping motor detected by the control-purpose position detecting unit and the rotating position included in the command information; and an amplitude value setting unit. The amplitude value setting unit switches operations of stator coils of the stepping motor pursuant to the command information, rotate the stepping motor to the rotating position included in the command information, and increase or decrease an amplitude value of a drive current fed to the stator coils during stoppage of the stepping motor depending on the positional deviation calculated by the control-purpose deviation calculating unit.

6 Claims, 7 Drawing Sheets

DRIVE CIRCUIT AND DRIVE METHOD OF A STEPPING MOTOR

BACKGROUND OF THE INVENTION

1. Field of the Invention

The present invention relates to a drive circuit and drive method for a stepping motor for driving, e.g., a tube pump mounted to a medical device.

2. Description of the Related Art

There is conventionally known a tube pump as a pump device for use in a medical device. The tube pump is designed to convey a liquid within a liquid-circulating tube by rotating a rotor unit having a pressing roller with a drive motor and squeezing the tube with the pressing roller.

As one example of the tube pump of this kind, there is available a tube pump of the type in which a liquid is delivered little by little over a period of time. In the tube pump of this type, it is necessary to drive the rotor unit at a reduced speed. For that reason, the tube pump employs, e.g., a brushless motor, as a drive motor. The rotation speed of the motor is reduced by a speed reducing mechanism, thereby driving the rotor unit. To cope with the case that the motor becomes inoperable, the tube pump is provided with a manual operation mechanism for manually rotating the rotor unit.

Since a gear mechanism is often used as the speed reducing mechanism for reducing the rotation speed of the drive motor, it is unavoidable that noises are generated due to the meshing of the gears in the speed reducing mechanism. Thus, the conventional tube pump suffers from a problem of increased noises. In particular, an extremely high level of silence is required in a medical device. The noise problem is therefore of paramount importance in the tube pump for use in a medical device.

In the conventional tube pump, if the rotor unit is rotated by the manual operation mechanism, the rotor shaft of the motor is simultaneously rotated by way of the speed reducing mechanism. Thus, a high amount of force is required in the manual operation. For that reason, the conventional tube pump poses a problem in that the operability in the manual operation is very low.

In addition, since the tube is squeezed by the pressing roller in the conventional tube pump, a reaction force (load) of the tube continuously acts on the pressing roller. Therefore, if the motor is stopped to thereby halt the operation of the tube pump, the pressing roller is returned back, which may possibly cause the liquid to flow backward.

As a solution to these problems, it has been contemplated that a stepping motor could be used as the drive motor and the rotor unit is directly driven by the motor shaft with the speed reducing mechanism omitted. In this case, the omission of the speed reducing mechanism makes it possible to reduce the noises and to enhance the operability in the manual operation. In addition, the stepping motor is driven to maintain the stop position when stopped. Accordingly, it is possible to avoid occurrence of a phenomenon that the pressing roller is returned back by the reaction force of the tube, and to prevent the liquid from flowing backward.

Although the stepping motor, when stopped, can be maintained in the stop position by supplying stator coils with the same drive current as supplied during operation, there is a problem in that the stepping motor generates a larger amount of heat than that generated by a brushless motor. For that reason, if the stepping motor is applied to a tube pump, there appears a drawback that the temperature of the drive motor is increased to a level far higher than in the conventional case. In case of a medical device, when the properties of the liquid conveyed are taken into account, it is necessary to avoid a temperature increase in the liquid caused by the drive motor as much as possible. If the rotor unit of the tube pump is directly driven by the drive motor, the heat of the drive motor will be easily transferred to the rotor unit because the speed reducing mechanism is omitted. Accordingly, it is necessary to further reduce heat generation in the drive motor when the rotor unit is directly driven by the stepping motor.

SUMMARY OF THE INVENTION

In view of the problems noted above, preferred embodiments of the present invention provide a drive circuit and drive method for a stepping motor arranged to significantly reduce heat generation in the stepping motor as compared with the above-described conventional stepping motors.

In one preferred embodiment of the present invention, a stepping motor drive circuit includes a control-purpose controller arranged to control an operation of a stepping motor, the control-purpose controller preferably including: a control-purpose position detecting unit arranged to detect a rotating position of the stepping motor by using a control-purpose position detector provided in the stepping motor; a rotation command information inputting unit arranged to receive command information on the rotating position of the stepping motor; a control-purpose deviation calculating unit arranged to calculate a positional deviation between the rotating position of the stepping motor detected by the control-purpose position detecting unit and the rotating position included in the command information; and an amplitude value setting unit arranged to switch operations of stator coils provided in the stepping motor pursuant to the command information, to rotate the stepping motor to the rotating position included in the command information and to increase or decrease an amplitude value of a drive current fed to the stator coils during stoppage of the stepping motor, depending on the positional deviation calculated by the control-purpose deviation calculating unit.

With the stepping motor drive circuit, the amplitude value of the drive current is increased or decreased depending on the positional deviation between the rotating position of the stepping motor detected by the control-purpose position detecting unit and the rotating position included in the command information. This eliminates the need to unnecessarily increase the drive current and thereby makes it possible to keep the stepping motor in the stopped position by driving the stator coils with a sufficient amount of drive current with respect to a driven load. As a result, it is possible to significantly reduce heat generation in the stepping motor as compared with the prior art. For example, if the reaction force from a driven object is strong, the positional deviation grows larger. In response, a larger drive current is fed to the stepping motor. This makes it possible to prevent the stepping motor from being returned back (i.e., from undergoing reverse direction rotation) by the reaction force. In contrast, if the reaction force is weak enough to keep the stepping motor in the stopped position with a small force, the positional deviation grows smaller. Accordingly, the stepping motor can be kept in the stopped position with a smaller drive current.

In another preferred embodiment of the present invention, a stepping motor drive method includes a control-purpose position detecting step of detecting a rotating position of a stepping motor by using a control-purpose position detector provided in the stepping motor; a rotation command information inputting step of receiving command information on the rotating position of the stepping motor; a control-purpose deviation calculating step of calculating a positional deviation between the rotating position of the stepping motor detected in the control-purpose position detecting step and the rotating position included in the command information; and an amplitude value setting step of switching operations of stator coils provided in the stepping motor pursuant to the command information, rotating the stepping motor to the rotating position included in the command information and increasing or decreasing an amplitude value of a drive current fed to the stator coils during stoppage of the stepping motor, depending on the positional deviation calculated in the control-purpose deviation calculating step.

With the above stepping motor drive method, the amplitude value of the drive current is increased or decreased depending on the positional deviation between the rotating position of the stepping motor detected in the control-purpose position detecting step and the rotating position included in the command information. This eliminates the need to unnecessarily increase the drive current and thereby makes it possible to keep the stepping motor in the stopped position by driving the stator coils with a sufficient amount of drive current with respect to a driven load. As a result, it is possible to significantly reduce heat generation in the stepping motor as compared with the prior art.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
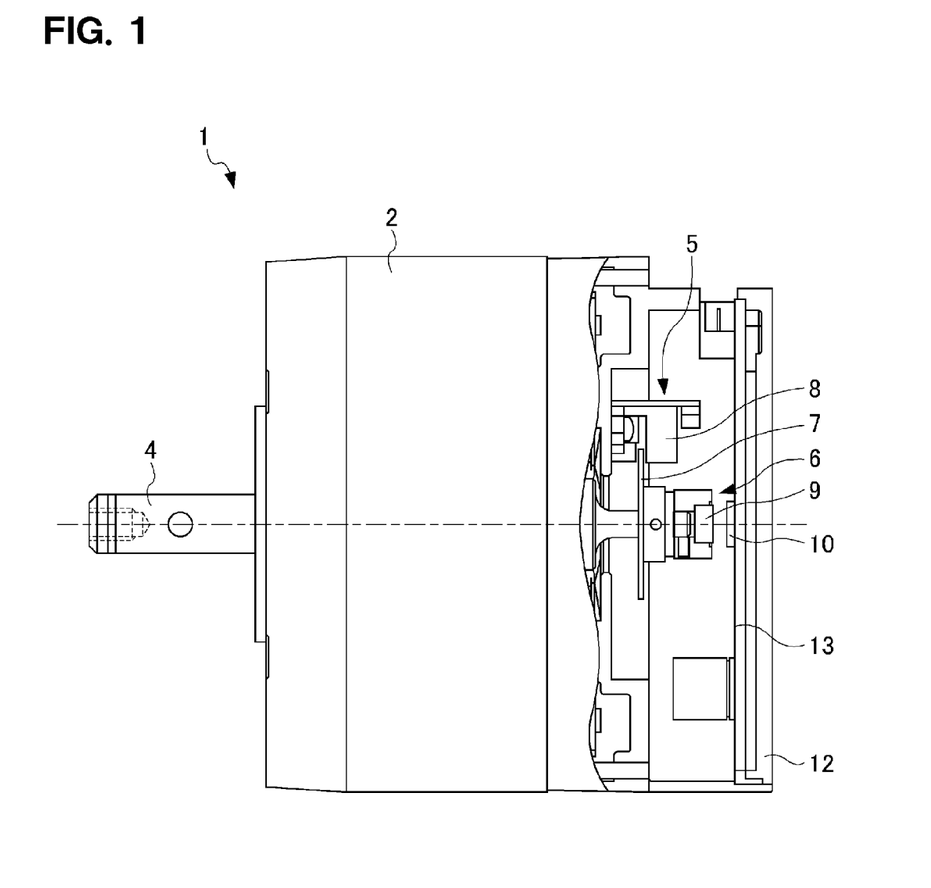
FIG. 1 is a view showing a drive device of a tube pump for use in a medical device according to a preferred embodiment of the present invention.

FIG. 1 is a view showing a drive device 1 of a tube pump that could be used, for example, in a medical device in accordance with a preferred embodiment of the present invention. The medical device used herein is, e.g., a dialyzer which conveys a dialyzed liquid through the use of a tube pump. The tube pump preferably includes a rotor unit directly driven by a drive motor of the drive device 1 shown in FIG. 1. This helps reduce noises and enhance operability during a manual operation.

The drive device 1 preferably includes the drive motor 2 and peripheral circuits provided to drive the drive motor 2. The drive motor 2 is, e.g., a three-phase stepping motor, and includes a rotating shaft 4, one end of which is connected to the rotor unit of the tube pump. Thus, the drive motor 2 directly drives the rotor unit.

First and second position detectors 5 and 6 each serving as devices arranged to detect the rotating position of the stepping motor are provided near the other end of the rotating shaft 4. The first position detector 5 is preferably an optical rotary encoder including a slit plate 7 and a photo sensor 8. The slit plate 7 is attached to the rotating shaft 4. The photo sensor 8 is arranged in alignment with the slit plate 7. The second position detector 6 is preferably a magnetic rotary encoder including a magnet 9 and an integrated circuit 10. The magnet 9 is arranged on the end surface of the rotating shaft 4. The integrated circuit 10 is arranged in an opposing relationship with the magnet 9.

In the present preferred embodiment, the first position detector 5 is preferably a so-called incremental type that generates a two-phase output signal whose level varies with the rotation of the slit plate 7. In contrast, the second position detector 6 is preferably a so-called absolute value type. In the second position detector 6, the magnetic fields of the magnet 9 are detected, for example, by two Hall elements provided in the integrated circuit 10. The detection results are processed by the integrated circuit 10. The second position detector 6 generates positional information depending on the absolute value based on a reference direction decided by the orientation of the integrated circuit 10.

The other end of the drive motor 2 is covered by a cover 12. A wiring board 13 is provided at the inner side of the cover 12. The integrated circuit 10 and the peripheral circuits are mounted on the wiring board 13.

Figure 2:
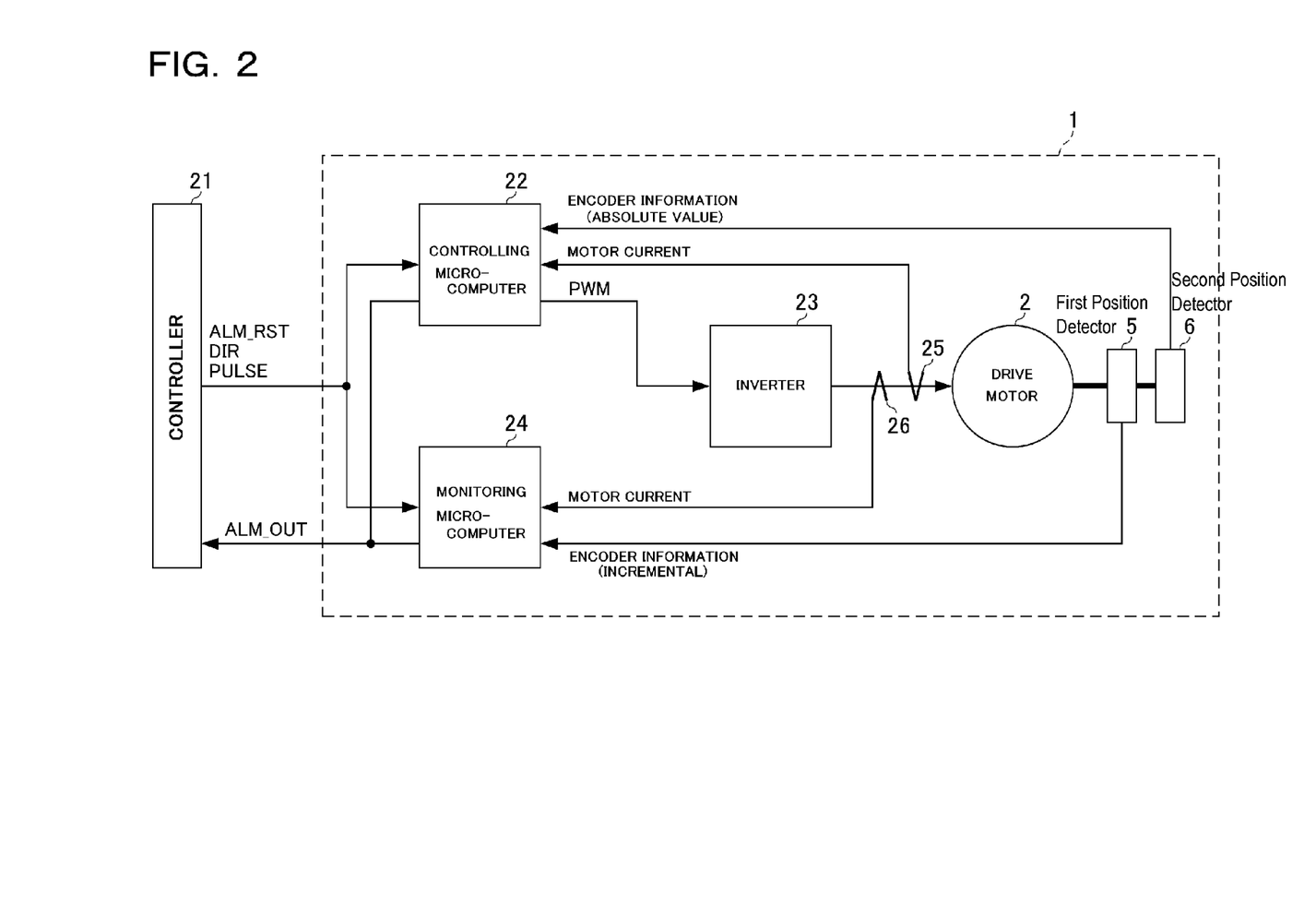
FIG. 2 is a view illustrating peripheral circuits of the drive device shown in FIG. 1.

FIG. 2 is a view illustrating the peripheral circuits of the drive device 1 in detail. Pursuant to the operation conducted by an operator, different kinds of control signals are inputted into the drive device 1 from a host controller 21 including a microcomputer arranged to control the overall operations of the medical device. The drive device 1 outputs different kinds of signals to the host controller 21. The control signals outputted from the controller 21 preferably include a direction command signal (DIR), a command pulse (PULSE) and a reset signal (ALM-RST). The direction command signal (DIR) is a control signal commanding the rotating direction of the drive motor 2. The command pulse (PULSE) is a pulse signal commanding the rotating amount of the drive motor 2. In the drive device 1, the drive motor 2 is rotated by a specified angle as the command pulse (PULSE) is generated once. Therefore, the command pulse (PULSE) is outputted with a period conforming to the desired rotating speed of the drive motor 2. If the drive motor 2 is to be rotated at a high speed, the command pulse (PULSE) is outputted in a short period. The reset signal (ALM-RST) is a signal for cancelling the stop control of the drive motor 2 induced by various kinds of abnormalities. An alarm signal (ALM-OUT), one of the signals fed to the controller 21, is a signal provided to notify the controller 21 of an abnormality occurring in the drive device 1.

In the drive device 1, a controlling microcomputer 22 is a control-purpose controller arranged to control the operation of the drive motor 2. The controlling microcomputer 22 switches the operations of stator coils of the drive motor 2 and rotates the drive motor 2 to the rotating position commanded by the controller 21. Using the positional information (encoder information) detected by the second position detector 6 and the motor current, the controlling microcomputer 22 generates a plurality of pulse width modulation (PWM) signals for the drive motor 2 in conformity with the direction command signal (DIR) and the command pulse (PULSE).

The motor current referred to herein is the actually measured value of a drive current of the drive motor 2 and is detected by use of a current sensor 25 dedicated to the controlling microcomputer 22. The drive device 1 feeds the PWM signals to an inverter 23. The drive device 1 drives the corresponding stator coils of the drive motor 2 in response to the output of the inverter 23. Thus, the drive device 1 rotates the drive motor 2 in the direction commanded by the direction command signal (DIR) by switching the operations of the stator coils of the drive motor 2 in response to the command pulse (PULSE). Data required for a monitoring microcomputer 24 to monitor the operation of the drive motor 2 are transmitted between the controlling microcomputer 22 and the monitoring microcomputer 24 in a specified time interval. The operation of the drive motor 2 is stopped under the control of the monitoring microcomputer 24. The controlling microcomputer 22 performs an initializing process upon receiving the reset signal (ALM-RST) and starts up the operation thereof.

The monitoring microcomputer 24 is a monitoring-purpose controller arranged to monitor the operation of the drive motor 2 and the operation of the controlling microcomputer 22. By comparing the rotating position commanded by the direction command signal (DIR) and the command pulse (PULSE) with the actual rotating position detected by the first position detector 5, the monitoring microcomputer 24 detects any abnormality in the rotation of the drive motor 2 and generates the alarm signal (ALM-OUT). The motor current monitored by the monitoring microcomputer 24 is the actually measured value of a drive current of the drive motor 2 and is detected by use of a current sensor 26 dedicated to the monitoring microcomputer 24. The monitoring microcomputer 24 monitors the power supply voltage of the inverter 23 and generates the alarm signal (ALM-OUT) if the power supply voltage is abnormal. Operation monitoring data are transmitted between the monitoring microcomputer 24 and the controlling microcomputer 22. The monitoring microcomputer 24 generates the alarm signal (ALM-OUT) when failed to normally send and receive the operation monitoring data. When generating the alarm signal (ALM-OUT), the monitoring microcomputer 24 stops the operation of the controlling microcomputer 22. The monitoring microcomputer 24 performs an initializing process upon receiving the reset signal (ALM-RST) and starts up the operation thereof.

Figure 3:
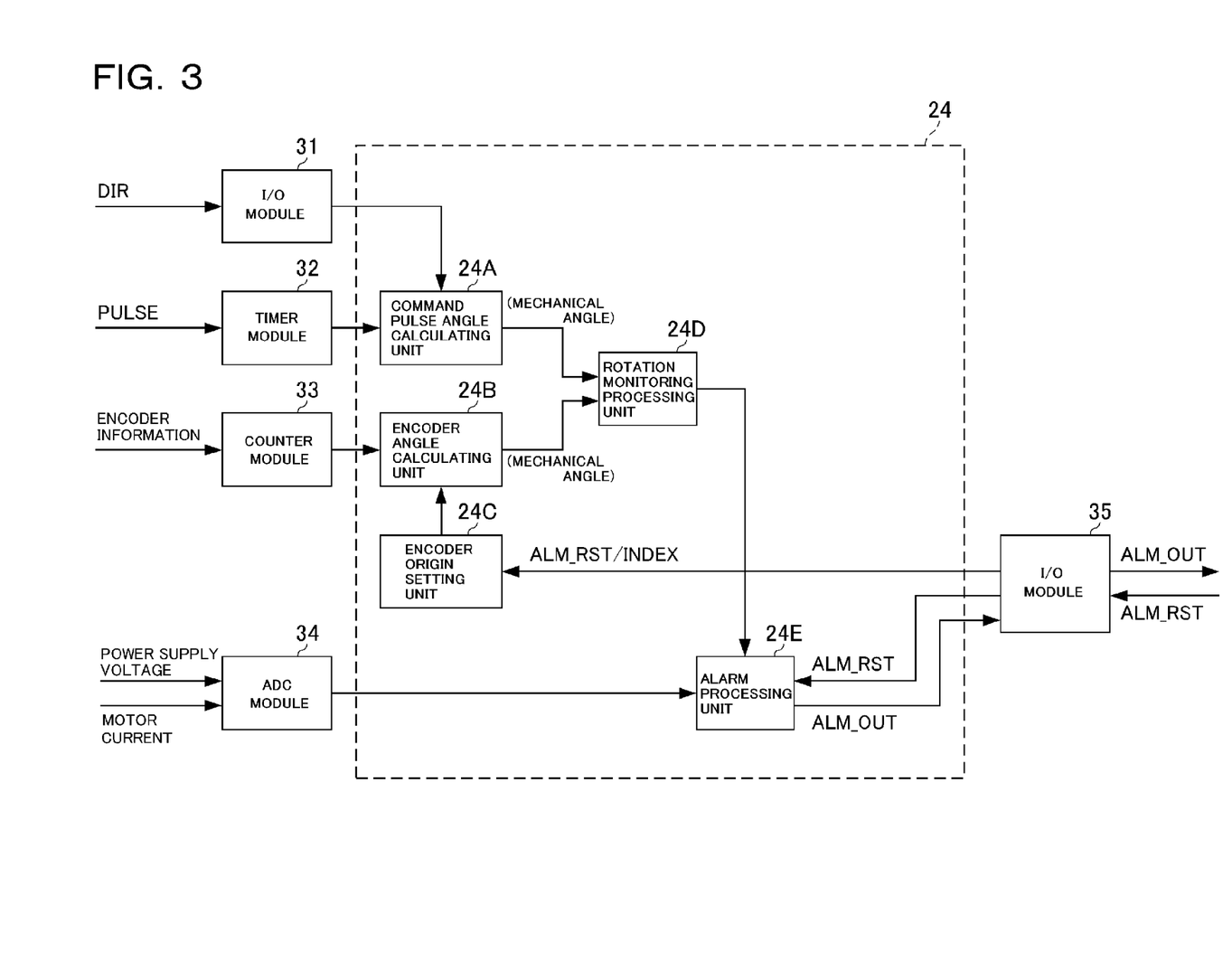
FIG. 3 is a functional block diagram showing the configuration of a monitoring microcomputer 24 of the drive device shown in FIG. 1, together with the peripheral circuits.

FIG. 3 is a functional block diagram showing the configuration of the monitoring microcomputer 24 together with the peripheral circuits. The direction command signal (DIR) is inputted to the monitoring microcomputer 24 through an I/O module as an input/output circuit. The command pulse (PULSE) is inputted to the monitoring microcomputer 24 through a timer module 32 as an input/output circuit. The two-phase output signal from the first position detector 5 is inputted to the monitoring microcomputer 24 through a counter module 33, preferably a so-called quadrature counter. The motor current detected by the current sensor 26 and the power supply voltage supplied to the inverter 23 are analog-digital converted in an ADC module 34 arranged as an analog-digital converting circuit and are inputted to the monitoring microcomputer 24 through the ADC module 34. The alarm signal (ALM-OUT) is outputted from the monitoring microcomputer 24 through an I/O module 35 as an input/output circuit. The reset signal (ALM-RST) is inputted to the monitoring microcomputer 24 through the I/O module 35. In this manner, operation monitoring data are transmitted between the monitoring microcomputer 24 and the controlling microcomputer 22.

In the monitoring microcomputer 24, a command pulse angle calculating unit 24A calculates the rotating position of the drive motor 2 commanded by the controller 21 by counting up or counting down the command pulse (PULSE) depending on the direction command signal (DIR). An encoder angle calculating unit 24B detects the actual rotating position of the drive motor by counting up or counting down the output signal of the counter module 33. If the reset signal (ALM-RST) is outputted from the controlling microcomputer 22, the encoder angle calculating unit 24B causes an encoder origin setting unit 24C to set a count value (INDEX) detected by the controlling microcomputer 22. In response, the position of origin used in detecting the rotating position is set to correspond to the processing in the controlling microcomputer 22. Thus, the encoder angle calculating unit 24B detects the rotating position of the drive motor 2 based on the mechanical angle from the origin.

Using the rotating position of the drive motor 2 detected by the encoder angle calculating unit 24B and the commanded rotating position of the drive motor 2 obtained by the command pulse angle calculating unit 24A, a rotation monitoring processing unit 24D detects the deviation of the rotating position of the drive motor 2 from the normal rotating position commanded by the controller 21. The detection results are notified to an alarm processing unit 24E. More specifically, the rotation monitoring processing unit 24D calculates a positional deviation (angular difference) between the rotating position detected by the encoder angle calculating unit 24B and the rotating position detected by the command pulse angle calculating unit 24A. If the positional deviation becomes greater than a determination reference value, occurrence of an abnormality is notified to the alarm processing unit 24E. In other words, the greater angular difference indicates the greater deviation of the actual position of the rotating shaft 4 from the target position of the rotating shaft 4 commanded by the command pulse (PULSE). This means that the tube pump is not normally operated due to the abnormality of the controlling microcomputer 22 or the like, which means that an extremely serious abnormality has occurred in the medical device.

Responsive to the notification from the rotation monitoring processing unit 24D, the alarm processing unit 24E outputs the alarm signal (ALM-OUT) to the controller 21 through the I/O module 35. The alarm processing unit 24E monitors the power supply voltage of the inverter 23 inputted through the ADC module 34. If the power supply voltage is changed to a value greater than a predetermined reference value, it is determined that the drive motor 2 cannot be operated normally. Thus, the alarm processing unit 24E outputs the alarm signal (ALM-OUT) to the controller 21. Similarly, the alarm processing unit 24E monitors the motor current inputted through the ADC module 34. If the motor current is changed to a value greater than a predetermined reference value, it is determined that the drive motor 2 cannot be operated normally and further that a large amount of heat is being generated in the drive motor 2. Thus, the alarm processing unit 24E outputs the alarm signal (ALM-OUT) to the controller 21. In addition, if the alarm processing unit 24E fails to normally receive operation monitoring data from the controlling microcomputer 22, it is determined that the controlling microcomputer 22 is in a so-called hung-up condition and further that the drive motor 2 cannot be operated normally. Thus, the alarm processing unit 24E outputs the alarm signal (ALM-OUT) to the controller 21. By outputting the alarm signal (ALM-OUT) in this manner, the controller 21 instructs the controlling microcomputer 22 to stop operation.

In contrast, if the reset signal (ALM-RST) is inputted from the controller 21, the alarm processing unit 24E initializes the respective units of the monitoring microcomputer 24 and causes the respective units to resume their operations. The initialization referred to herein means the setting of the count value (INDEX), etc.

In the drive device 1, as set forth above, the rotating position of the stepping motor is detected by a system differing from the controlling microcomputer 22. The abnormality of rotation of the stepping motor is detected by determining the positional deviation between the rotating position of the stepping motor and the rotating position included in the command information. In the drive device 1, it is therefore possible to reliably detect an abnormality and to cope with the abnormality even when the drive motor 2 cannot be normally controlled by the controlling microcomputer 22. Accordingly, it is possible to apply the drive device 1 to a medical device requiring increased reliability and to secure great reliability.

In the monitoring microcomputer 24, the encoder angle calculating unit 24B serves as a monitoring-purpose position detecting unit arranged to detect the rotating position of the stepping motor by using the first position detector 5 provided in the stepping motor. The rotation monitoring processing unit 24D serves as a monitoring-purpose deviation calculating unit arranged to calculate the positional deviation between the rotating position detected by the monitoring-purpose position detecting unit and the rotating position included in the command information. In cooperation with the rotation monitoring processing unit 24D, the alarm processing unit 24E serves as a determining unit arranged to determine the positional deviation calculated in the monitoring-purpose deviation calculating unit to detect an abnormality of rotation of the stepping motor and output an alarm signal when the abnormality is detected.

Figure 4:
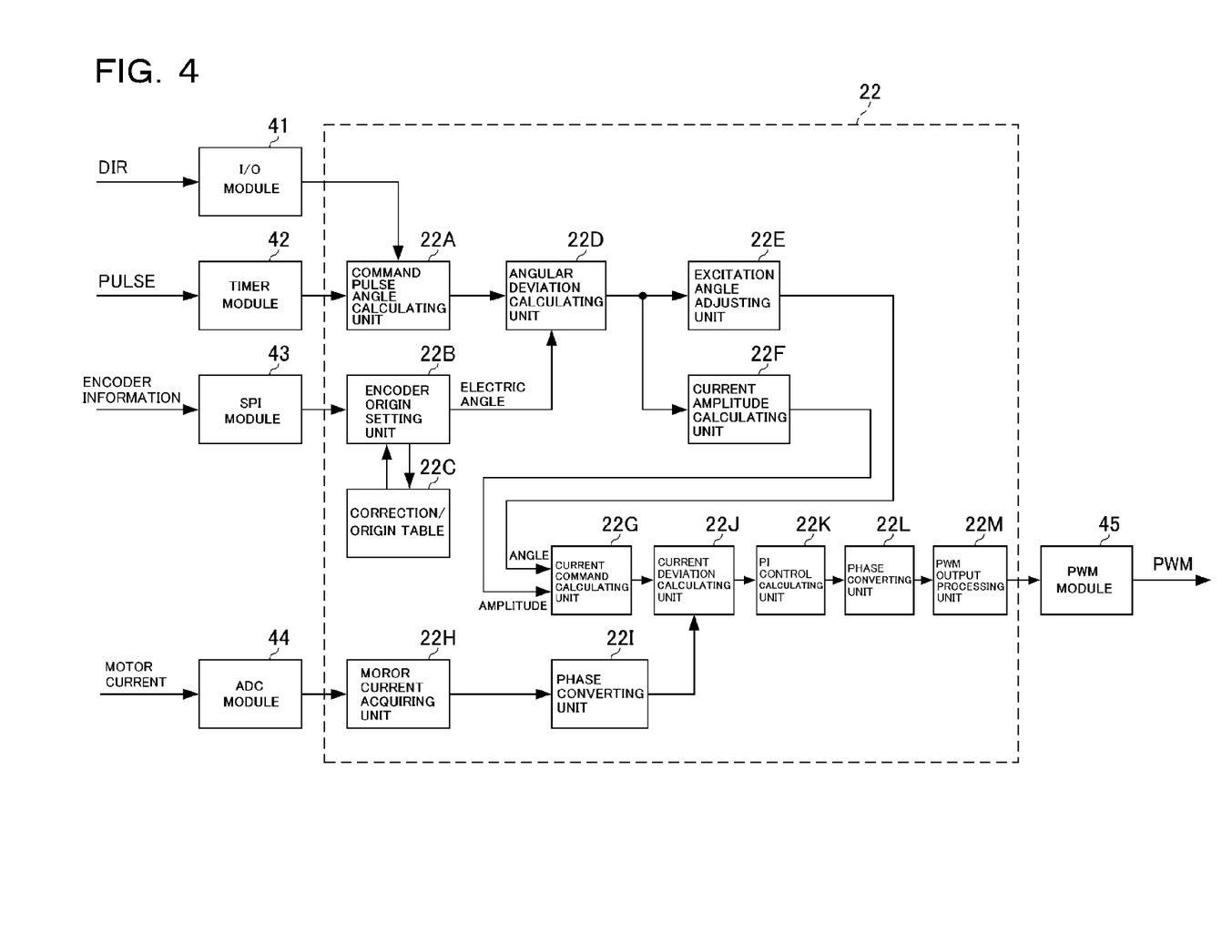
FIG. 4 is a functional block diagram showing the configuration of a controlling microcomputer 22 of the drive device shown in FIG. 1, together with the peripheral circuits.

FIG. 4 is a functional block diagram showing the configuration of the controlling microcomputer 22 together with the peripheral circuits. The direction command signal (DIR) is inputted to the controlling microcomputer 22 through an I/O module 41 as an input/output circuit. The command pulse (PULSE) is inputted to the controlling microcomputer 22 through a timer module 42 as an input/output circuit. The output signal from the second position detector 6 is inputted to the controlling microcomputer 22 through an SPI module 43 as a serial-parallel converting circuit. The motor current detected by the current sensor 25 is analog-digital converted by an ADC module 44 arranged as an analog-digital converting circuit and is inputted to the controlling microcomputer 22 through the ADC module 44. In addition, the controlling microcomputer 22 outputs a PWM signal to the inverter 23 through a PWM module 45 as an output circuit.

In the controlling microcomputer 22, a command pulse angle calculating unit 22A calculates the rotating position of the drive motor 2 commanded by the controller 21 by counting up or counting down the command pulse (PULSE) depending on the direction command signal (DIR). An encoder angle calculating unit 22B corrects the positional information (encoder information) inputted through the SPI module 43, using the correction values recorded in a correction/origin table 22C. This helps prevent characteristic degradation which may be caused by the installation error of the second position detector 6. The positional information corrected by the encoder angle calculating unit 22B is used as the count value (INDEX) set forth above.

An angular deviation calculating unit 22D calculates the positional deviation between the actual rotating position of the stepping motor and the rotating position included in the command information issued from the controller 21 by processing the rotating position of the drive motor 2 corrected in the encoder angle calculating unit 22B, based on the target rotating position of the drive motor 2 obtained by the command pulse angle calculating unit 22A. An excitation angle adjusting unit 22E calculates the excitation angle required in driving the drive motor 2, based on the positional deviation. Using the positional deviation, a current amplitude calculating unit 22F calculates the amplitude value of the drive current to be supplied to the stator coils of the drive motor 2. Based on the calculation results of the excitation angle adjusting unit 22E and the current amplitude calculating unit 22F, a current command calculating unit 22G calculates, in two phases, the drive signal to be used in driving the drive motor 2.

The actually measured value of drive current detected by the current sensor 26 is inputted to a motor current acquiring unit 22H through the ADC module 44. A phase converting unit 22I converts the motor current fed from the motor current acquiring unit 22H to a motor current required to drive the drive motor 2 in two phases, thereby converting the actually measured value of the drive current so as to correspond to the calculation result of the current command calculating unit 22G. If desirable or if necessary, the phase converting unit 22I may be omitted. Based on the output of the phase converting unit 22I, a current deviation calculating unit 22J corrects the calculation result of the current command calculating unit 22G and outputs the corrected calculation result. Thus, the controlling microcomputer 22 drives the drive motor 2 by feed-back controlling the drive motor 2 with the actually measured value of the motor current.

A PI control calculating unit 22K sequentially integrates the calculation result of the current deviation calculating unit 22J by a transfer integral and adds a weighted integration result to the calculation result of the current deviation calculating unit 22J. Consequently, the PI control calculating unit 22K converts the calculation result of the current deviation calculating unit 22J to a PI control format. A phase converting unit 22L converts the calculation result of the PI control calculating unit 22K to a three-phase calculation result corresponding to the phase number of the drive motor 2 and outputs the three-phase calculation result. Depending on the three-phase calculation result outputted from the phase converting unit 22L, a PWM output processing unit 22M generates a PWM signal and outputs the PWM signal to the inverter 23 through a PWM module 45.

As stated above, the current amplitude calculating unit 22F of the controlling microcomputer 22 calculates the amplitude value of the drive current of the drive motor 2 depending on the positional deviation calculated by the angular deviation calculating unit 22D. In the present preferred embodiment, if the positional deviation is greater than the minimum rotation angle (minimum resolution), the current amplitude calculating unit 22F sets the amplitude value in conformity with the rated current value of the drive motor 2. In contrast, if the positional deviation is smaller than the minimum rotation angle, the current amplitude calculating unit 22F sets the amplitude value such that the drive current value becomes smaller than the rated current value as the positional deviation grows smaller. In response, the controlling microcomputer 22 calculates the amplitude value depending on the positional deviation such that, when the drive motor 2 is stopped, the amplitude value of the drive current becomes greater as the positional deviation grows larger. More specifically, the amplitude value of the drive current is set in proportion to the square of the positional deviation. If the positional deviation is equal to or smaller than a specified value, the amplitude value of the drive current is set constant.

Figure 5:
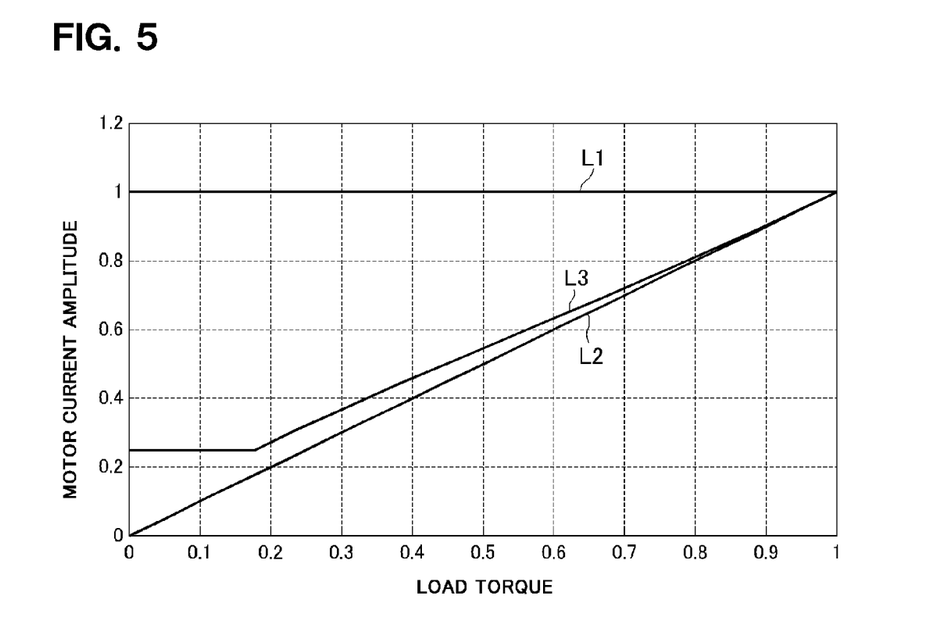
FIG. 5 is a characteristic curve diagram explaining the amplitude of a drive current in the drive device shown in FIG. 1.

In a conventional stepping motor, stator coils are driven with a drive current of constant amplitude. This drive current is continuously fed to the stator coils even when the stepping motor is kept in a stationary position where no load torque is required. In the conventional stepping motor, as designated by reference symbol L1 in FIG. 5, a drive current having a constant amplitude is fed regardless of load torque. In FIG. 5, the load torque indicated in the horizontal axis is the ratio to the rated load torque. The amplitude of the motor current indicated in the vertical axis is the ratio to the rated current.

In the meantime, a direct current motor is driven by a drive current proportional to load torque. In case of the direct current motor, as designated by reference symbol L2, the drive current becomes smaller than that of a stepping motor as the load torque grows smaller. This leads to a reduction in the power consumption and the heat generation amount. No electric power is consumed in a stopped state in which the load torque remains zero.

If, as in the present preferred embodiment, the amplitude is calculated and set depending on the positional deviation such that the amplitude of the drive current becomes greater as the positional deviation grows larger, it is possible, as designated by reference symbol L3, to set the drive current such that the drive of the conventional stepping motor becomes similar to the drive of the direct current motor. This makes it possible to significantly reduce the heat generated in the stepping motor as compared with conventional stepping motors.

In this case, if the reaction force from a driven object is strong, the positional deviation grows larger. In response, a larger drive current is fed to the stepping motor. This makes it possible to prevent the stepping motor from being returned back by the reaction force and to reliably keep the stepping motor in the stopped position. In contrast, if the reaction force is weak enough to keep the stepping motor in the stopped position with a small force, the positional deviation grows smaller. Accordingly, the stepping motor can be kept in the stopped position with a smaller drive current.

More specifically, if the amplitude value of the drive current is set in proportion to the square of the positional deviation, it is possible to set the drive current in conformity with the load characteristics of the stepping motor. It is also possible to effectively avoid degradation of characteristics of the stepping motor and thus to efficiently reduce heat generation in the stepping motor.

Moreover, if the positional deviation is equal to or smaller than a specified value, the amplitude value of the drive current is set constant. This makes it possible to reduce variation of rotation when the stepping motor is rotated at an extremely low speed and to reduce positional deviation when the stepping motor is stopped. Thus, the encoder angle calculating unit 22B can detect the rotating position with a tolerance no greater than the minimum rotation angle of the drive motor 2.

In the present preferred embodiment, the encoder angle calculating unit 22B is arranged as a control-purpose position detecting unit arranged to detect the rotating position of the stepping motor by using the second position detector 6 provided in the drive motor 2 as a stepping motor. The command pulse angle calculating unit 22A is arranged as a rotation command information inputting unit to receive command information on the rotating position of the stepping motor. The angular deviation calculating unit 22D is arranged as a control-purpose deviation calculating unit to calculate the positional deviation between the rotating position of the stepping motor detected by the control-purpose position detecting unit and the rotating position included in the command information. The current amplitude calculating unit 22F, the command pulse angle calculating unit 22A, the encoder angle calculating unit 22B, the angular deviation calculating unit 22D, the excitation angle adjusting unit 22E and the current command calculating unit 22G serve together as an amplitude value setting unit to switch the operations of the stator coils provided in the stepping motor in response to the command information, causing the stepping motor to rotate to the rotating position indicated by the command information and to increase or decrease the amplitude value of the drive current fed to the stator coils during stoppage of the stepping motor depending on the positional deviation calculated by the control-purpose deviation calculating unit.

In the drive device 1, the magnet 9 and the integrated circuit 10 provided as the second position detector 6 have installation errors with respect to the rotating shaft 4 of the drive motor 2. Consequently, the rotating positions of the rotating shaft 4 detected by the integrated circuit 10 show variations. Therefore, when controlling the drive current based on the rotating positions detected by the integrated circuit 10, the torque of the drive motor 2 varies depending on the rotating positions.

Figure 6:
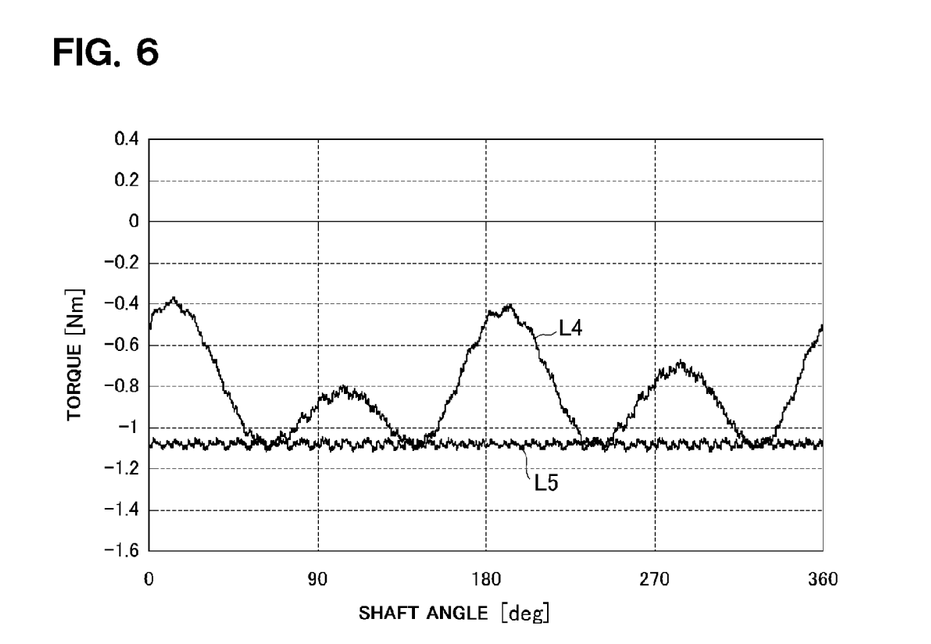
FIG. 6 is a characteristic curve diagram explaining the torque variation in the drive device shown in FIG. 1.
Figure 7:
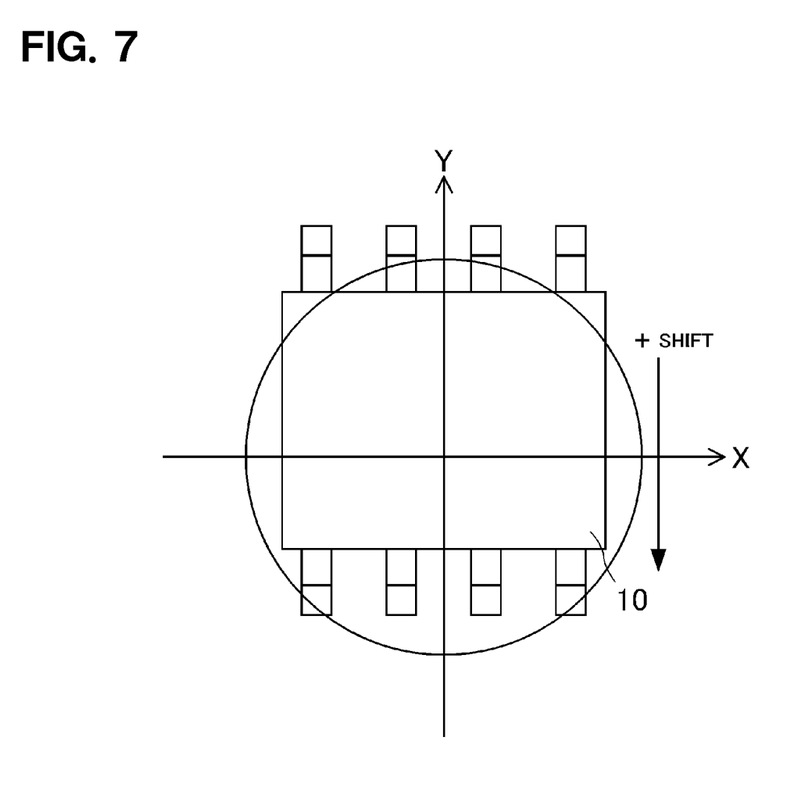
FIG. 7 is a plan view of an integrated circuit 10 explaining the characteristic curve diagram shown in FIG. 6.

FIG. 6 is a view showing the measurement results of the torque variations. The measurement results shown in FIG. 6 are obtained by measuring the torque variations in a state that the integrated circuit 10 is shifted −0.7 mm in the Y direction with respect to the rotation axis of the rotating shaft 4 as indicated by an arrow in FIG. 7. The X direction and the Y direction correspond to the directions in which the magnetic fields are detected by the Hall elements provided in the integrated circuit 10. The respective coordinate axes indicate the magnetic field detecting directions with the rotation axis of the rotating shaft 4 set as the origin. In the measurement stated above, the drive motor 2 is driven with a current equal to one half of a rated current. In this case, as indicated by reference symbol L4 in FIG. 6, the torque is greatly changed as the rotating shaft 4 rotates.

In the present preferred embodiment, therefore, the actually measured values are corrected by the correction values set in the correction/origin table 22C. For that purpose, when manufacturing the drive device 1, the controlling microcomputer 22 causes the drive motor 2 to rotate by a specified angle or more. Position detection results are acquired by the second position detector 6. Data for correction are stored in the correction/origin table 22C. In FIG. 6, reference symbol L5 indicates the torque variations in case where the position detection results acquired by the second position detector 6 are corrected using the correction/origin table 22C. It can be seen in FIG. 6 that it is possible to reliably prevent the torque variations attributable to the installation errors of the second position detector 6.

Figure 8:
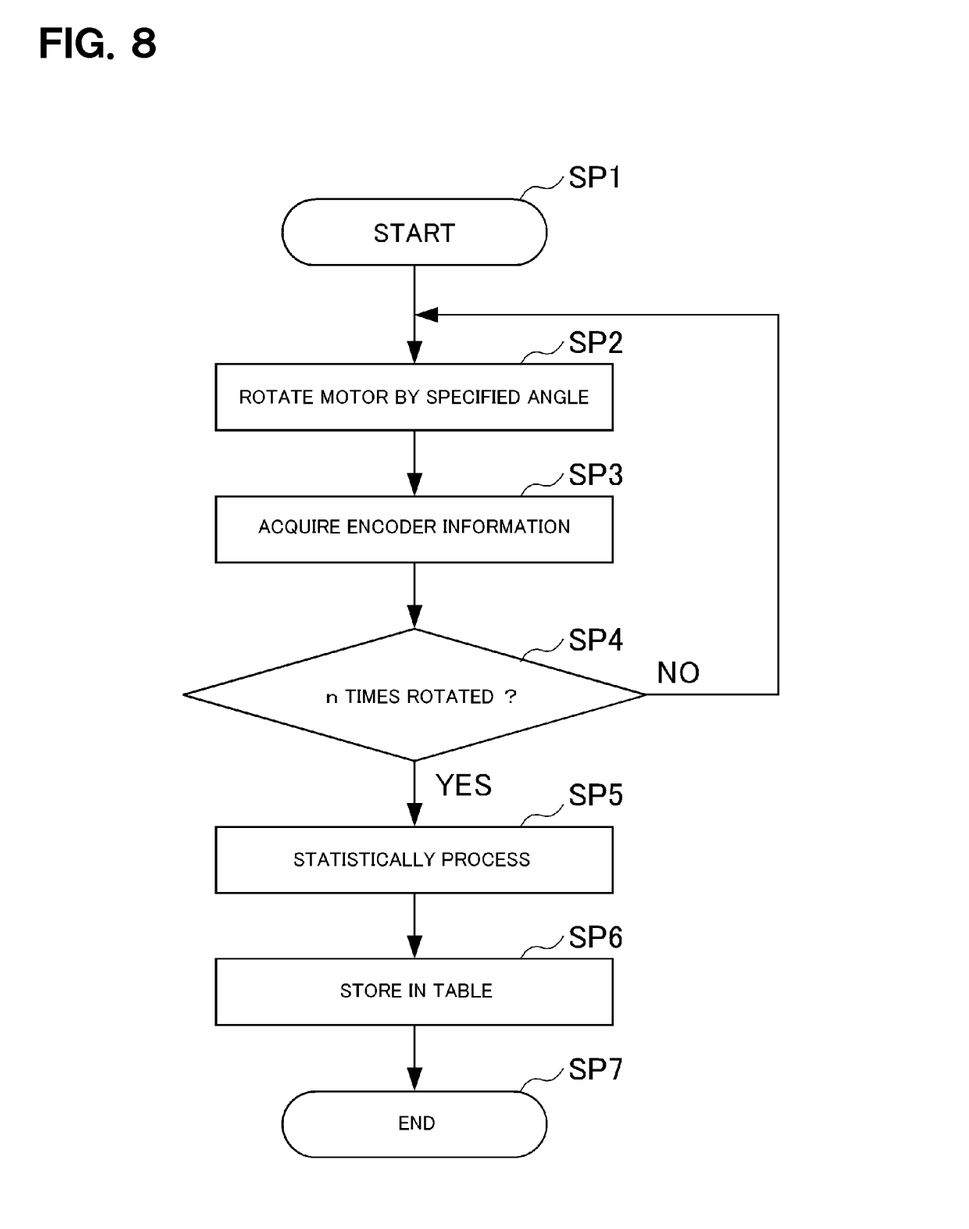
FIG. 8 is a flowchart explaining the setting values of a table in the drive device shown in FIG. 1.

FIG. 8 is a flowchart illustrating a routine for setting the correction/origin table 22C, which is performed by the controlling microcomputer 22. By executing the routine shown in FIG. 8, the drive device 1 causes the controlling microcomputer 22 to drive the drive motor 2. The controlling microcomputer 22 acquires the position detection results of the second position detector 6.

In the routine, the controlling microcomputer 22 instructs the drive motor 2 to rotate by a specified angle (steps SP1 and SP2) and acquires the rotating position information (encoder information) from the second position detector 6 (step SP3). The controlling microcomputer 22 repeats this processing until the drive motor 2 is rotated by a specified number of revolution n (step SP4), thereby acquiring the rotating position information on the respective rotating positions. The specified angle noted above is, e.g., the minimum rotation angle of the drive motor 2. Subsequently, the controlling microcomputer 22 eliminates the influence of noises by statistically processing the rotating position information acquired during the n-times rotation of the drive motor 2 (step SP5). The statistic processing is, e.g., the simple averaging processing of the detection results in the respective rotating positions. Then, the controlling microcomputer 22 calculates the difference between the detection results of the respective rotating positions and the instructed rotating positions to find the correction values of the rotating position information. The correction values are stored in the correction/origin table 22C (step SP6). During the operation of the drive motor 2 after the storage of the correction values, the routine illustrated is not executed (SP7) and the drive motor 2 is driven with reference to the data stored as above.

With the configuration described above, the amplitude value of the drive current is increased or decreased depending on the positional deviation between the rotating position of the stepping motor detected by the control-purpose position detecting unit and the rotating position included in the command information. This eliminates the need to unnecessarily increase the drive current and makes it possible to keep the stepping motor in the stopped position with an amount of drive current that is feasible in practice. As a result, it is possible to significantly reduce heat generation in the stepping motor as compared with the conventional case.

By setting the amplitude value in proportion to the square of the positional deviation, it is possible to properly set the amplitude value and to efficiently reduce heat generation in the stepping motor.

By setting the amplitude value of the drive current constant when the positional deviation is equal to or smaller than a specified value, it is possible to prevent the stepping motor from being returned back by the reaction force of a driven object. It is also possible to reduce variation of rotation when the stepping motor is rotated at an extremely low speed and to reduce positional deviation when the stepping motor is stopped.

The positional deviation between the rotating position detected separately and the rotating position included in the command information is determined by the monitoring-purpose controller. Upon detecting abnormal rotation of the stepping motor, the monitoring-purpose controller outputs an alarm signal. Therefore, if the stepping motor cannot be normally driven by the control-purpose controller, it is possible to reliably detect such an abnormality and to generate an alarm signal. Accordingly, it is possible to apply the drive device to a medical device requiring increased reliability and to secure sufficient reliability.

The rotating positions detected by the position detectors are corrected using the correction values stored in a memory. The correction values stored in the memory are set using the rotating position information acquired by rotating the drive motor by a specified angle. This makes it possible to detect the rotating positions by correcting the position detection errors attributable to the installation errors of the position detectors. As a result, it is possible to prevent variation of the torque generated.

Other Preferred Embodiments

While exemplary preferred embodiments of the present invention have been described above, the present invention is not limited thereto. The configurations of the foregoing preferred embodiment may be modified in many different forms without departing from the scope and spirit of the present invention.

In the foregoing preferred embodiments, the controlling microcomputer and the monitoring microcomputer are preferably provided with their own position detectors and current sensors. However, the present invention is not limited thereto. If desirable, the controlling microcomputer and the monitoring microcomputer may share a position detector and/or a current sensor. Similarly, the controlling microcomputer and the monitoring microcomputer may share a command pulse angle calculating unit.

In the foregoing preferred embodiments, the optical and magnetic rotary encoders are preferably used as monitoring-purpose and control-purpose position detectors. However, the present invention is not limited thereto. Many other configurations may be used in the position detectors.

In the foregoing preferred embodiment, the amplitude value of the drive current preferably is increased or decreased depending on the positional deviation when the positional deviation is equal to or smaller than the minimum rotation angle. However, the present invention is not limited thereto. It is only necessary that, when the drive motor is kept in the stopped position, the amplitude value of the drive current be increased or decreased depending on the positional deviation. The increasing and decreasing range of the amplitude value of the drive current may be differently set in case where the required characteristics can be secured in practice, e.g., in the case where the amplitude value of the drive current is increased or decreased depending on the positional deviation no greater than two times of the minimum rotation angle or in case where the amplitude value of the drive current is increased or decreased depending on the positional deviation no greater than one half of the minimum rotation angle.

In the foregoing preferred embodiments, if the positional deviation is equal to or smaller than the minimum rotation angle of the drive motor, the amplitude value of the drive current during stoppage of the drive motor is set depending on the positional deviation by increasing or decreasing the amplitude value of the drive current depending on the positional deviation calculated by the deviation calculating unit. However, the present invention is not limited thereto. In a nutshell, it is only necessary that the amplitude value of the drive current during stoppage of the drive motor be set depending on the positional deviation. It is possible to extensively use various kinds of setting methods, e.g., a method of detecting the positional deviation which has become zero and converting the specified amplitude value of the drive current to an amplitude value corresponding to the positional deviation, or a method of converting the specified amplitude value of the drive current to an amplitude value corresponding to the positional deviation as the positional deviation continues to be zero for a specified time period.

In the foregoing preferred embodiments, the tube pump of the present invention is preferably applied to a medical device. However, the present invention is not limited thereto. The present invention may be extensively applied to different kinds of liquid handling devices, for example.

In the foregoing preferred embodiments, the stepping motor drive method is preferably applied to a tube pump. However, the present invention is not limited thereto. The present invention may be applied to different stepping motor drive methods for driving various kinds of devices, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stepping motor drive circuit, comprising:
   a control-purpose controller arranged to control an operation of a stepping motor, the control-purpose controller including:

a control-purpose position detecting unit arranged to detect a rotating position of the stepping motor by using a control-purpose position detector provided in the stepping motor;

a rotation command information inputting unit arranged to receive command information on the rotating position of the stepping motor;

a control-purpose deviation calculating unit arranged to calculate a positional deviation between the rotating position of the stepping motor detected by the control-purpose position detecting unit and the rotating position included in the command information; and an amplitude value setting unit arranged to switch operations of stator coils provided in the stepping motor pursuant to the command information, to rotate the stepping motor to the rotating position included in the command information and to increase or decrease an amplitude value of a drive current fed to the stator coils during stoppage of the stepping motor depending on the positional deviation calculated by the control-purpose deviation calculating unit.

2. The circuit of claim 1, wherein the amplitude value setting unit is configured to set the amplitude value in proportion to the square of the positional deviation.

3. The circuit of claim 2, wherein the amplitude value setting unit is configured to set the amplitude value constant when the positional deviation is equal to or smaller than a specified value.

4. The circuit of claim 1, further comprising:
a monitoring-purpose controller including:
a monitoring-purpose position detecting unit arranged to detect the rotating position of the stepping motor by using a monitoring-purpose position detector provided in the stepping motor;
a monitoring-purpose deviation calculating unit arranged to calculate a positional deviation between the rotating position of the stepping motor detected by the monitoring-purpose position detecting unit and the rotating position included in the command information; and
a determining unit arranged to determine the positional deviation calculated by the monitoring-purpose deviation calculating unit to detect an abnormality of rotation of the stepping motor and generate an alarm signal.

5. The circuit of claim 1, wherein the control-purpose position detecting unit is arranged to correct the rotating position of the stepping motor detected by the control-purpose position detector using correction values stored in a memory, the correction values being obtained by rotating the stepping motor by a specified angle pursuant to the command information and detecting the rotating position of the stepping motor with the control-purpose position detector.

6. A stepping motor drive method, comprising:
a control-purpose position detecting step of detecting a rotating position of a stepping motor by using a control-purpose position detector provided in the stepping motor;

a rotation command information inputting step of receiving command information on the rotating position of the stepping motor;

a control-purpose deviation calculating step of calculating a positional deviation between the rotating position of the stepping motor detected in the control-purpose position detecting step and the rotating position included in the command information; and an amplitude value setting step of switching operations of stator coils provided in the stepping motor pursuant to the command information, rotating the stepping motor to the rotating position included in the command information and increasing or decreasing an amplitude value of a drive current fed to the stator coils during stoppage of the stepping motor, depending on the positional deviation calculated in the control-purpose deviation calculating step.

* * * * *